Oct. 14, 1969  A. V. C. DAVIS  3,472,980

DISK SPRING MOTION CONVERTER

Filed Oct. 19, 1967  2 Sheets-Sheet 1

INVENTOR.
ALLEN V.C. DAVIS
BY
Perry E. Turner
ATTORNEY

Oct. 14, 1969 — A. V. C. DAVIS — 3,472,980
DISK SPRING MOTION CONVERTER
Filed Oct. 19, 1967 — 2 Sheets-Sheet 2

INVENTOR
ALLEN V. C. DAVIS
Perry E. Turner
ATTORNEY

United States Patent Office 3,472,980
Patented Oct. 14, 1969

3,472,980
DISK SPRING MOTION CONVERTER
Allen V. C. Davis, 5600 Alta Canyada,
La Canada, Calif. 91011
Filed Oct. 19, 1967, Ser. No. 676,505
Int. Cl. H01h 13/26, 13/50
U.S. Cl. 200—67        10 Claims

ABSTRACT OF THE DISCLOSURE

A coned disk snap spring has tongues bent back from its periphery and angled toward its axis. The periphery is supported against axial movement. Depressing the tongue nearest the small end of the spring establishes a creep deflection at the periphery which results in axial snap of the spring's center. The end of the other tongue is subjected to a lateral arc motion to make and break conductive contact with spaced fixed contacts.

BACKGROUND OF THE INVENTION

Field of the invention

This invention relates to a coned disk snap spring utilized to convert linear motion of a part thereof to axial snap action of the spring and another part thereof.

Description of the prior art

Disk snap springs of the Belleville type have heretofore been operated by holding either its smaller or larger periphery against axial movement, and mechanically engaging and forcing its free periphery axially to effect snap action thereof. There is no known way to utilize linear motion of an integral part of such a spring to effect such snap action.

SUMMARY OF THE INVENTION

The invention comprises a coned disk snap spring of negative spring rate having an integral loading or actuating tongue of positive spring rate bent from its outer periphery and extending at an angle toward the spring axis. Movement of the tongue toward the spring causes the spring to snap away from the tongue. Upon releasing the tongue, the spring snap deflects back toward the tongue. By virtue of these actions, an integral output tongue bent from the spring's periphery toward its axis is subjected to lateral movement, which can be utilized to provide a mechanical or electrical output.

DESCRIPTION OF THE PREFERRED EMBODIMENTS

Figure 1:
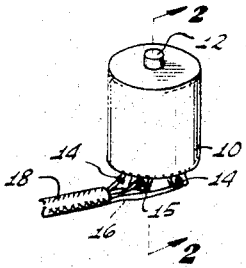
FIG. 1 is a perspective view of a switch incorporating the motion converter of my invention.

Referring to the drawings, FIG. 1 illustrates a switch that incorporates the motion converter of my invention, which is illustrated as a cylindrical housing 10 at one end of which is a manually operable pushbutton 12 for actuating the switch. The ends of two pairs of terminal strips 14, 15 extend from the opposite end of the housing 10, and the ends of electric leads or wires 16 extending from a sheath or cable 18 are electrically connected, as by soldering, to the ends of the terminal strips.

Figure 5:
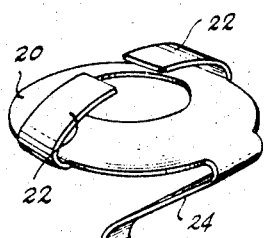
FIG. 5 is a perspective view of the motion converter in the switch of FIGS. 1–4.

Before proceeding with the description of the switch, reference will be made to FIG. 5 which illustrates the unique motion converter of my invention. In essence, the converter is a coned disk snap spring 20 which has one or more integral tongues 22. The spring 20, which may be a conventional Belleville spring, is shown in FIG. 5 in its upright position, i.e., with the small end of the cone uppermost. With reference to such position, the tongues 22 are bent upwardly and inwardly toward the axis of the spring. Each tongue 22 is spaced from the spring 20 and provides means whereby, upon holding the periphery of the spring 20 against axial movement, moving the end of the tongue toward the spring effects snap action of the spring.

In this latter connection, the end of the tongue 22 is pressed axially toward the small end of the spring. Since the tongue is anchored to the periphery of the spring, such periphery by this action is effectively utilized as a fulcrum. Accordingly, the bending moment sets up a creep deflection in the tongue and body of the spring which fans radially inwardly toward the small end of the spring as movement of the end of the tongue progresses. The spring rate of the tongue is less positive than the spring 20 is negative. Further, whereas the spring 20 has a negative spring rate, the tongue 22 has a positive spring rate. Depending upon these spring rates, the tongue action effects a snap action of the spring 20 at a predetermined position of the end of the tongue.

To effect reverse snap action of the spring 20, the end of the tongue is allowed to back off from the position at which it caused the initial snap. Again depending upon the positive spring rate of the tongue, and also the negative rate of the spring 20, the end of the tongue moves a predetermined distance away from the small end of the spring 20, to a position in which the spring snaps back. Such a snap action disk spring can be preloaded, so that extremely small axial movements of the end of the tongue 22 are sufficient to effect snap action of the spring as described.

In the switch embodiments illustrated and described herein, the snap spring is utilized to effect lateral motion of still another tongue that is integral with the spring. Still referring to FIG. 5, a tongue 24 is bent at the periphery of the spring 20, and is a substantially straight element that forms an angle with the plane of the peripheral edge of the spring 20, and which extends toward the axis of the spring on the side thereof opposite the tongues 22. The end of the tongue 24 extends generally axially, and carries a contact member 26. In the two positions of the spring 20 above described, the end of the tongue 24, and hence the contact member 26, is in different positions, and its movement between these positions is generally transverse to the axis of the spring 20. Thus, axial snap action of the spring 20 effects lateral snap action of the tongue 24 and its contact 26. How this action is utilized in an electrical switch will now be described with reference to FIGS. 1–4.

Figure 2:
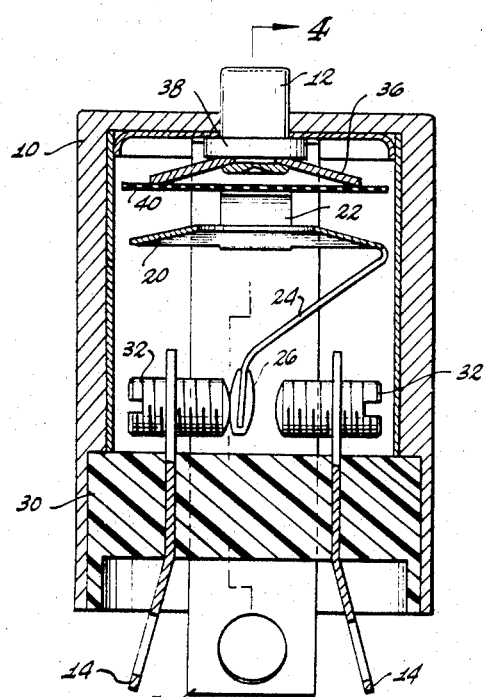
FIG. 2 is a longitudinal sectional view of the switch of FIG. 1, showing a movable contact carried by a Belleville spring motion converter wherein the contact is adapted for movement between horizontally spaced contacts in response to vertical movement of the spring, the movable contact normally engaging one fixed contact in the upper position of the spring.
Figure 3:
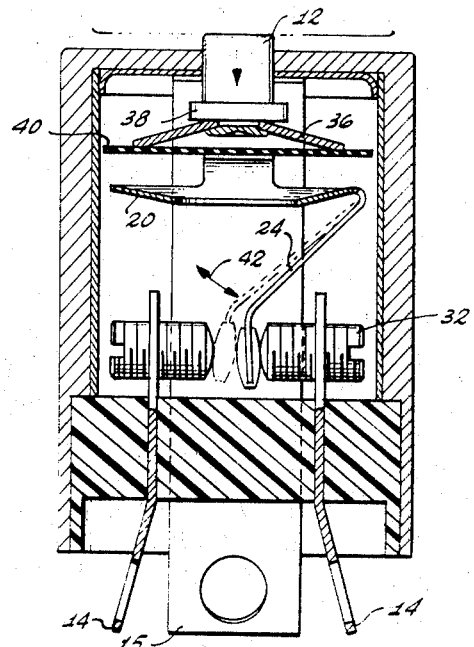
FIG. 3 is a longitudinal sectional view like FIG. 1 in which the spring is pressed down to move the movable contact into engagement with the other fixed contact.

Secured in the open end of the cylinder 10 is an insulating insert 30, which may be made of plastic material, in which conductive plates forming the terminal strips 14, 15 are embedded. There are four spaced terminal strips in this example. As best seen in FIGS. 2 and 3, two of the opposed terminal strips 14 carry stationary contacts 32 at their inner ends. In this connection, the inner ends of the terminal strips are provided with openings, and in assembly the contacts 32, which are threaded elements with screwdriver slots, are turned through such openings in assembly to the desired positions. The contact 26 carried on the tongue 24 is positioned between the stationary contacts 32. Further, the condition of the spring 20 is such that, before the pushbutton 12 is depressed, the tongue 24 is in such position that fixed contact 26 engages one of the contacts 32.

Figure 4:
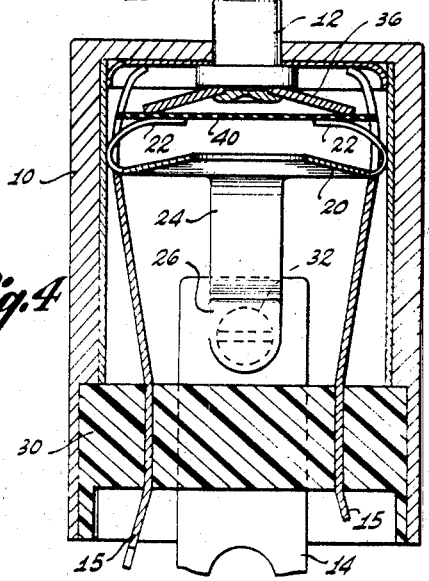
FIG. 4 is a fragmentary sectional view taken along the line 4—4 of FIG. 2, showing upwardly extending arms of the spring by which the spring action is controlled.

The remaining terminal strips 14 are elements which support the spring 20. In this connection, and as best seen in FIG. 4, the inner ends of these strips extend to the closed end of the cylinder 10, and such ends are forked so as to straddle the tongues 22. The portions of the tongues attached to the periphery of the spring 22 are cradled in the forks. Thus, the tongues 22 seat in the bottoms of the forks.

Further, the terminal strips 15 supporting the spring 20 are spring-biased inwardly against the periphery of the spring. To this end, assembly of the parts is effected by bowing the terminal strips outwardly and placing the tongues 22 between the prongs of the forks. The terminal strips 15 are then released, and, since they are of spring metal, they firmly engage the portions of the spring on either side of the tongues, and thereby capture and hold the spring 20 in place. Thus assembled, the contact 26 on the tongue 24 is located between the stationary contacts 32.

With the parts assembled as above described, the contact 26 bears against one of the stationary contacts 32. Since the tongue 24 is a spring member, its contact 26 is in firm engagement with one of the contacts 32. To insure firm engagement, such contact 32 can be threadedly adjusted as desired in its terminal strip 14.

Preparatory to inserting the above described assembly into the cylinder 10, the button 12 is fitted with a stiff coned washer 36, and this subassembly is inserted into the cylinder 10, with the button 12 extending through the central opening in the closed end of the cylinder. As shown, the button 12 is provided with an inner flange 38 which is adapted to engage the inner surface of the closed end of the cylinder, and the periphery of the washer 36 rests on the upper surface of an insulation disk 40 which is placed on the tongues 22.

In one arrangement, the disk 40 is relatively thin, to permit the periphery of the washer 36 to act through it against the portions of the tongues directly beneath such periphery. In this latter connection, it will be seen that for washers 36 of different diameters, the portions of the tongues 22 operated thereby require different force levels to move them toward the spring 20. In another arrangement, the disk 40 is a rigid element, so that the force level required to move the tongues depends upon the lengths of the tongues and the portions thereof engaged by the disk. For these arrangements, as will become more evident, the size of the washer 36 in the one arrangement can be selected, and the lengths and shapes of the tongues 22 in the other arrangement can be adjusted, to conform to the characteristics of the spring 20.

As shown in FIGS. 2–4, the cylinder 10 may be provided with a shoulder against which the inner end of the insert 30 is seated when it is forced into the cylinder. With the assembly thus completed the upper ends of the forked terminal strips 14 abut the closed end of the cylinder 10. (If desired, a metal plate may be secured to the inner surface of the top of the cylinder, to allow the upper ends of the terminal strips to bear against it.) Further, the tongues 22 normally bias the button 12 outwardly, i.e., so that its flange 38 abuts the inner surface of the closed end of the cylinder. In this connection, the parts preferably are dimensioned so that the tongues 22 are slightly depressed. By this means, the spring 20 is given a preload.

In the arrangement as described, the preload on the spring 20 is determined by the dimensions of the parts. Where the disk 40 is a rigid element, the amount of preload can be adjusted in assembly, e.g., the washer 36 may be replaced with a threaded rod (not shown) which extends through the button 12 to engage the disk 40. For this purpose, the outer end of the threaded rod may be provided with a screwdriver slot, and adapted to be turned (while holding the button 12 stationary) to move the disk 40 against the ends of the tongues 20 and thereby establish a desired preload on the spring 20.

As will be observed from the parts as shown, by manually operating the button 12, the tongues 22 via the washer 36 and disk 40 are forced toward the small end of the spring 20, and the forces thus established cause the spring to snap downwardly. Such snap action is accompanied by a transverse movement of the tongue 24, and hence the contact 26, whereupon the contact 26 breaks contact with one fixed contact 32, and is brought into conductive contact with the other fixed contact 32.

At this point, it should be noted that the spring 20 is a conductive element. The terminal strips 15 supporting the spring 20 are of course conductively connected thereto at all times. The supporting terminal strips preferably are connected to a common or reference potential, while the remaining terminal strips 14, i.e., those supporting the fixed contacts 32, are connected to respective leads 16 through which external circuits are to be operated as desired. Thus, in the position of the parts shown in FIGS. 2 and 4, a path to ground is established through the left hand contact 32, the contact 26, the tongue 24, the spring 20, the terminal strips 15 supporting the spring, and ground. When the button 12 is depressed, as in FIGURE 3, the circuit just mentioned is broken and contact to ground is established through the right hand fixed contact 32, the contact 26, the tongue 24, the spring 20, and the terminal strips 15 supporting the spring.

A switch formed in accordance with my invention has the unique advantages that the spring 20 effects snap action of the contact 26 from either of its two positions to the other, and that the contacts are self-cleaning. The snap action is rendered substantially instantaneous, of course, because of the negative spring rate characteristic of the snap spring 20. Self cleaning of the contacts occurs (compare FIGS. 2 and 3) because the end of the tongue 24, and hence the contact 26, moves in an arc during its movement transverse to the axis of the spring, as indicated by the double-headed arrow 42 in FIGURE 3.

Referring to FIG. 3, the dotted position of the contact 26 and its tongue 24 is the same as that shown in solid lines in FIG. 2. When the spring 20 snaps downwardly, thereby causing the contact 26 to snap from left to right, the contact 26 on leaving the left fixed contact 32 effectively wipes against the face of such contact as it snaps away from it. When the contact 26 comes into engagement with the right hand fixed contact 32, the spring action of the tongue 24 is sufficient to insure firm electrical engagement between the contacts. When the pushbutton 12 is released, and the spring 20 snaps upwardly, the contact 26 undergoes a similar wiping action upon snapping away from such right hand contact 32 to return to its position shown in FIG. 2. Because of this aspect of the invention, I provide low resistance dry circuit contacts which are long lasting and do not require preventive maintenance.

Figure 11:
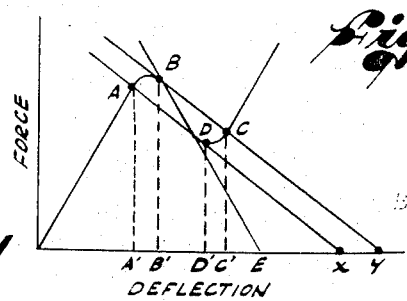
FIG. 11 is a force-deflection curve to aid in explaining the functions of different parts of the converter of my invention.

The operation of my motion converter and switch will be further explained with reference to FIG. 11. With reference to the disk spring force-deflection curve 44, the portion A–B is that in which positive the tongue loading takes place. The positive spring rate of the loading tongue(s), shown along the line X–A, is less than the disk spring negative spring rate, shown along line E–B. As tongue loading increases, the disk spring deflects linearly to point B.

When the disk spring deflection reaches point B, the stored force in the tongue exceeds that in the disk spring, whereupon the disk spring snaps from point B to point C, and the tongue linearly deflects from point X to point Y. Thus, at point C the forces in the tongue and disk spring are equal. When the tongue is allowed to return from point Y to point X, the disk spring linearly deflects from point C to point D. At point D the force stored in the disk spring exceeds that in the tongue, and the disk spring snaps from D to A.

Viewing the projections on the abscissa from left to right, the disk spring linearly deflects from A' to B' as the tongue loading increases from X to Y, and then snap deflects from B' to C'. Viewed from right to left, the disk spring linearly deflects from C' to D' as tongue loading decreases from Y to X, and then snap deflects from D' to A'. In this latter connection, the preload on the spring may be initially set, by appropriate selection of the size of the washer 36 and/or shaping of the tongues 22, to vary the separation between points X and Y, and to move such points closer to point E. Thus, points X and Y may be brought to point E, i.e., the preload on the disk spring may be such that the spring instantaneously snap deflects upon initiation of loading tongue movement. Further in this connection, it should be noted that the limits of disk spring motion are determined as positions wherein the forces of the loading tongues and the disk spring are equal, i.e., no external stops are necessary in the operation of the system. As will now be apparent, my device is adapted for controlled motion amplification.

In the switch, I adjust the spacing between the fixed contacts so that movement of tongue 24 occurs only between points B' and D'. By so doing, wiping action takes place only during the linear deflections of the disk spring, i.e., the movable contact 26 snaps away from either fixed contact solely during the snap deflections of the disk spring.

Figure 6:
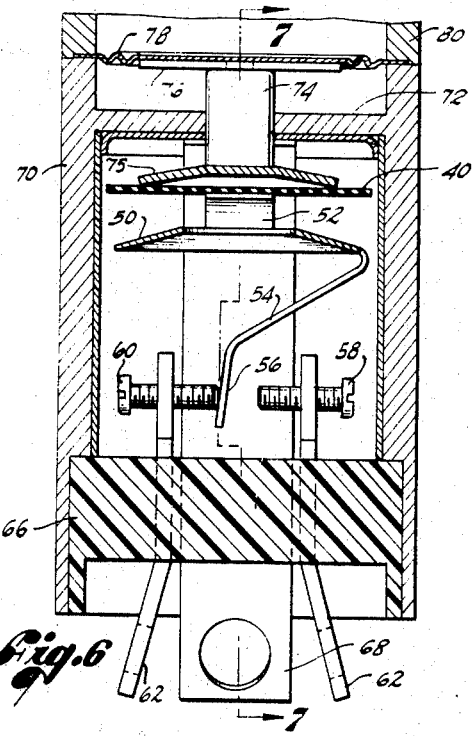
FIG. 6 is a longitudinal sectional view of the modification of the switch of FIGS. 1–5.
Figure 7:
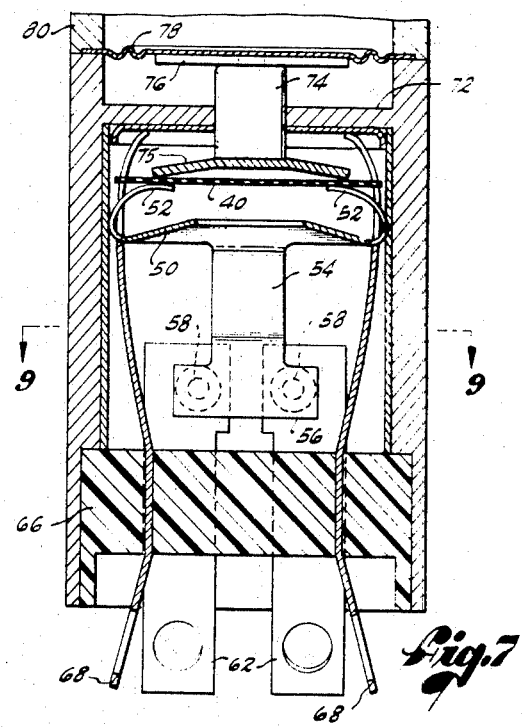
FIG. 7 is a sectional view taken along the line 7—7 of FIG. 6.
Figure 9:
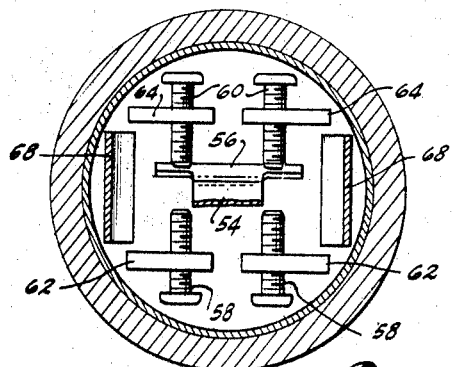
FIG. 9 is a sectional view taken along the line 9—9 of FIG. 7.
Figure 8:
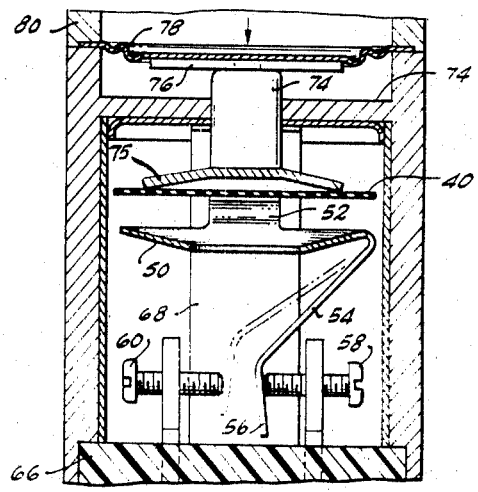
FIG. 8 is a fragmentary sectional view like FIG. 6, with the spring pressed down to move the movable contact laterally from bridging contact with one pair of fixed contacts to bridging contact with the other pair of fixed contacts.
Figure 10:
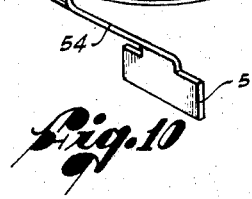
FIG. 10 is a perspective view of the motion converter in the switch of FIGS. 6–9.

FIGS. 6–10 illustrate an electrical switch of my invention adapted to be operated by fluctuating fluid pressures. FIG. 10 illustrates a snap spring 50 with actuating tongues 52, and with a tongue 54 having a contact end 56, all corresponding to the spring 20, the tongues 22, and the tongue 24 and its contact 26 as previously described. The difference is that the contact 56 is an elongated contact adapted to bridge the ends of adjacent fixed contacts. Referring to FIGS. 6 and 9, opposed pairs of fixed contacts 58, 60 are supported by the inner ends of opposed pairs of terminal strips 62, 64 which are embedded in an insulating insert 66. Also embedded in the insert 66 are elongated terminal strips 68 which are forked at their upper ends, and which, like the elongated terminal strips 15 previously described, straddle the tongues 52 and support the spring 50. The disk 40 is located on the tops of the tongues 52 as it was in the case of the tongues 22 of the spring 20 previously described.

As will be observed, the normal position of the contact 56, i.e., on the left hand side as in the case of the contact 26 in FIGURES 1–5, is one in which the contact 56 bridges the two contacts 60. When the contact 56 is snapped to the right (FIG. 8), it engages and bridges the two contacts 58. Thus, circuit leads connected to the terminal strips 62 are connected together when the contact 56 snaps into engagement with the contacts 48. Similarly, circuit leads connected to the terminal strips 64 are connected when the contact 56 is snapped back to bridge the contacts 60.

In this latter connection, the terminal strips 68 may be utilized in the same manner previously described to provide a ground or reference point connection. In such event, since it is not necessary that there be conductive connections from the terminal strips 68 to the contact 56, the contact 56 may be insulatingly mounted on the tongue 54.

In the embodiment shown in FIGS. 6–9, different means are illustrated for actuating the tongues 52. In this connection, there is shown a cylinder 70 having a lower opening into which the assembly of the parts above described are inserted and an intermediate wall 72 having a central opening through which a pin 74 is inserted. The lower end of the pin 74 carries a cone washer 75 which engages the upper surface of the disk 40. At its upper end, the pin 74 supports a plate 76 which is overlaid by a thin, flexible diaphragm 78. The periphery of the diagphragm 78 is suitably secured to the upper end of the cylinder 70, as by being clamped between the upper end of the cylinder 70 and the lower end of a fluid conduit 80. Desirably, the periphery of the diaphragm 78 is and the abutting ends of the cylinders 70, 80 are welded together.

With the above-described arrangement, when the pressure of fluid in the conduit 80 exceeds a predetermined level, pressure on the diaphragm 78 causes the plate 76 and pin 74 to be forced downwardly, thereby to actuate the spring 50. When the pressure is released, the spring 50 snaps back upwardly, and the tongues 52 force the disk 40, and hence the pin 74, upwardly. Thus, the fluid pressure actuation in the embodiment illustrated in FIGURES 6–9 accomplishes the same purpose as the manually operated pushbutton 12 of FIGURES 1–4.

Just as the motion converter may be actuated by different means, the laterally movable tongue thereof may be utilized for other than electrical switching functions. For example, the tongue may be atached to one end of a valve stem of a two-stage valve. In such case, the direction of fluid flow through the valve is determined by the position of the movable tongue.

From the foregoing, it will be apparent that various modifications can be made in the embodiments of my invention illustrated and described without departing from the spirit and scope of my invention. Accordingly, I do not intend that my invention be limited, but that it be accorded a scope corresponding to a reasonable interpretation of the appended claims.

I claim:

1. In combination:
   a coned disk snap spring having negative spring rate;
   a tongue integral with the periphery of said spring, said tongue being bent to extend at an angle toward the axis of said spring on the side thereof remote from its center portion,
      the end of said tongue being movable laterally of the axis upon axial snap movement of the center portion of said spring;
   a second tongue integral with the periphery of said spring and extending at an angle toward said axis on the side thereof nearest its center portion, said second tongue being movable toward the center portion of said spring to create a bending moment with less positive rate than said negative spring rate at the periphery of said spring to effect axial snap of said center portion.

2. The combination of claim 1, including a third tongue integral with the periphery of said spring, said third tongue being bent to extend toward said axis on the same side of said spring as said second tongue, said second and third tongues being diametrically opposed.

3. The combination of claim 1, including
a housing;
a pair of support members in said housing,
said support members engaging the periphery of said spring where said second and third tongues meet the periphery;
and means for effecting movement of said second and third tongues to impart snap movement of said center portion of said spring.

4. The combination of claim 3, wherein said last-named means includes an axialy movable member extending through a portion of said housing and adapted to exert force on portions of said tongues intermediate their ends and the periphery of said spring.

5. The combination of claim 4, including
a pair of fixed contacts in said housing,
the end of the first-mentioned tongue being conductive and disposed against one contact in the unsnapped position of said spring's center portion, and movable into engagement with the other contract when said center portion undergoes snap movement,
said spring, tongues and support members being conductive;
an external electrical connections to said contacts and said support members.

6. The combination of claim 4, including
a pair of fixed contacts in said housing,
the end of said first tongue being conductive and being disposed to bridge said contacts, said first tongue engaging and being disengaged from said contacts in the unsnapped and snapped positions of said center portion of said spring;
and external electrical connections to said contacts.

7. The combination of claim 4, including
two paris of fixed contacts in said housing,
the end of said first tongue being conductive and bridging the contacts of one pair in the unsnapped position of said spring's center portion, and moving to bridge the contacts of the other pair when said spring's center portion is snapped;
and respective external electrical connections to said contacts.

8. In combination:
a coned disk snap spring having a tongue integral with the periphery thereof, said tongue being bent to extend at an angle toward the axis of said spring on the side thereof nearest from its center portion;
and means for moving said tongue axially to effect axial snap movement of the center portion of said spring.

9. The combination of claim 8, including a second tongue integral with the periphery of the spring, said second tongue being bent and extending toward the other tongue, the ends of said tongues being movable axially in unison to effect axial snap movement of the center portion of said spring.

10. The combination of claim 8, including additional tongues integral with the periphery of the spring, each of said additional tongues being bent and extending toward the other tongue, the ends of said tongues being movable axially in unison to effect axial snap movement of the center portion of said spring.

References Cited
UNITED STATES PATENTS 1,988,345   1/1935   Vaughn _____ 74—100 X
2,420,880   5/1947   Hetherington.

ROBERT K. SCHAEFER, Primary Examiner

D. SMITH, JR., Assistant Examiner

U.S. Cl. X.R.
74—100; 267—1